US011174919B2

(12) United States Patent
Nishigaya et al.

(10) Patent No.: US 11,174,919 B2
(45) Date of Patent: Nov. 16, 2021

(54) SPEED REDUCTION DEVICE AND BRAKE ACTUATOR INCLUDING IHE SAME

(71) Applicant: TOYOTA JIDOSHA KABUSHIKI KAISHA, Toyota (JP)

(72) Inventors: Shinya Nishigaya, Toyota (JP); Yoji Yamauchi, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 16/676,729

(22) Filed: Nov. 7, 2019

(65) Prior Publication Data

US 2020/0158210 A1 May 21, 2020

(30) Foreign Application Priority Data

Nov. 21, 2018 (JP) .............................. JP2018-218541

(51) Int. Cl.
*F16H 1/32* (2006.01)
*F16H 1/34* (2006.01)
*F16D 65/18* (2006.01)

(52) U.S. Cl.
CPC ............ *F16H 1/321* (2013.01); *F16D 65/18* (2013.01); *F16H 1/34* (2013.01)

(58) Field of Classification Search
CPC ... F16H 1/32; F16H 1/321; F16H 1/34; F16H 2001/324; F16H 2001/327; F16D 65/18
See application file for complete search history.

(56) References Cited

U.S. PATENT DOCUMENTS

| 4,762,025 A | * | 8/1988 | Lew | .......................... F16H 1/32 475/175 |
| 2005/0255955 A1 | * | 11/2005 | Arakawa | ................... F16H 1/32 475/162 |
| 2008/0083383 A1 | * | 4/2008 | Sudou | ..................... F01L 1/352 123/90.15 |

(Continued)

FOREIGN PATENT DOCUMENTS

| DE | 373814 C | 4/1923 |
| DE | 19645825 A1 | 1/1998 |
| DE | 19907958 A1 | 9/2000 |

(Continued)

*Primary Examiner* — David R Morris
*Assistant Examiner* — Lori Wu
(74) *Attorney, Agent, or Firm* — Sughrue Mion, PLLC (57) ABSTRACT

A speed reduction device including a first internally meshing planetary gear mechanism and a second internally meshing planetary gear mechanism, including: a housing; an input shaft rotatably supported by the housing at its first shaft portion through a first bearing; a planetary gear member rotatably supported by an eccentric shaft portion of the input shaft through a second bearing; and an output shaft rotatably supported by a second shaft portion of the input shaft through a third bearing, wherein a distance in an axial direction between a first support position and a second support position is equal to a distance in the axial direction between the second support position and a third support position, and a distance in the axial direction between the second support position and an input-side meshing position is equal to a distance in the axial direction between the second support position and an output-side meshing position.

5 Claims, 4 Drawing Sheets

(56) References Cited

U.S. PATENT DOCUMENTS

| 2009/0101424 | A1* | 4/2009 | Suzuki | H02K 7/16 |
| | | | | 180/65.51 |
| 2019/0056012 | A1* | 2/2019 | Uehara | F16H 1/32 |

FOREIGN PATENT DOCUMENTS

| JP | 05-321990 A | 12/1993 |
| JP | 2007-321862 A | 12/2007 |
| JP | 2014-109315 A | 6/2014 |

\* cited by examiner

SPEED REDUCTION DEVICE AND BRAKE ACTUATOR INCLUDING IHE SAME

CROSS REFERENCE TO RELATED APPLICATION

The present application claims priority from Japanese Patent Application No. 2018-218541, which was filed on Nov. 21, 2018, the disclosure of which is herein incorporated by reference in its entirety.

BACKGROUND

Technical Field

The following disclosure relates to a speed reduction device including an internally meshing planetary gear mechanism and also relates to a brake actuator including the speed reduction device and configured to stop rotation of a wheel.

Description of Related Art

In recent years, a brake actuator as disclosed in Japanese Patent Application Publication No. 2014-109315, for instance, has been actively developed. The brake actuator includes an electric motor as a drive source and is configured to give, to a wheel, a braking force whose magnitude corresponds to a force generated by the electric motor. For achieving the brake actuator that is compact in size, it is desirable to employ a speed reduction device whose reduction ratio is relatively high, such as the one as disclosed in Japanese Patent Application Publication No. 5-321990.

SUMMARY

Though the speed reduction device disclosed in Japanese Patent Application Publication No. 5-321990 is considerably compact in size, it includes bearings used exclusively for the device, undesirably pushing up the cost of the device. Thus, there is much room for improvement in the speed reduction device, and some modifications enable achievement of a speed reduction device having high utility. Accordingly, one aspect of the present disclosure is directed to a speed reduction device having high utility. Another aspect of the present disclosure is directed to a brake actuator having high utility owing to employment of the speed reduction device.

In a first aspect of the present disclosure, a speed reduction device including (i) a first internally meshing planetary gear mechanism constituted by a first internally toothed gear and a first externally toothed gear that is meshing internally with the first internally toothed gear and (ii) a second internally meshing planetary gear mechanism constituted by a second internally toothed gear and a second externally toothed gear that is meshing internally with the second internally toothed gear, comprising:

a housing;

an input shaft including an eccentric shaft portion located intermediate in an axial direction and a first shaft portion and a second shaft portion respectively located on opposite sides of the eccentric shaft portion in the axial direction, the input shaft being rotatably supported by the housing at the first shaft portion through a first bearing;

a planetary gear member which is rotatably supported by the eccentric shaft portion of the input shaft through a second bearing and on which one of the first internally toothed gear and the first externally toothed gear and one of the second internally toothed gear and the second externally toothed gear are provided so as to be arranged in the axial direction; and an output shaft which is rotatably supported by the second shaft portion of the input shaft through a third bearing and on which the other of the second internally toothed gear and the second externally toothed gear is provided, wherein the other of the first internally toothed gear and the first externally toothed gear is provided on the housing, wherein, where a position at which the input shaft is supported through the first bearing, a position at which the planetary gear member is supported through the second bearing, and a position at which the output shaft is supported through the third bearing are respectively defined as a first support position, a second support position, and a third support position, a distance (hereinafter referred to as "input-side supporting distance" where appropriate) in the axial direction between the first support position and the second support position is equal to a distance (hereinafter referred to as "output-side supporting distance" where appropriate) in the axial direction between the second support position and the third support position and; and wherein a distance (hereinafter referred to as "input-side meshing distance" where appropriate) in the axial direction between the second support position and a position at which the first internally toothed gear and the first externally toothed gear are in mesh with each other (hereinafter referred to as "input-side meshing position" where appropriate) is equal to a distance (hereinafter referred to as "output-side meshing distance" where appropriate) in the axial direction between the second support position and a position at which the second internally toothed gear and the second externally toothed gear are in mesh with each other (hereinafter referred to as "output-side meshing position" where appropriate).

In a second aspect of the present disclosure, a brake actuator including the speed reduction according to the first aspect, including:

an electric motor configured to rotate the input shaft;

a piston configured to push a friction member onto a rotary body that rotates with a wheel: and a motion converting mechanism configured to convert a rotating motion of the output shaft into an advancing and retracting movement of the piston.

The speed reduction device according to the present disclosure may be referred to as a differential speed reduction device that employs internally meshing planetary gear mechanisms. The present speed reduction device is relatively compact in size and has a high reduction ratio. The high reduction ratio means that a ratio of the rotation speed of the output shaft with respect to the rotation speed of the input shaft is small. As will be later explained in detail, the speed reduction device of the present disclosure has the following features: (a) The input-side meshing distance and the output-side meshing distance are the same; (b) The output shaft is supported by the input shaft; and (c) The input-side supporting distance and the output-side supporting distance are the same. These features enable support loads with respect to the input shaft to be well balanced, resulting in efficient deceleration. Further, the present speed reduction device has fewer restrictions on bearings, and general-purpose bearings are available in the present speed reduction device, thus obviating a cost increase. Accordingly, owing to these advantages, the speed reduction device of the present disclosure is excellent in utility.

The brake actuator according to the present disclosure including the speed reduction device constructed as described above is excellent in utility.

In the input shaft of the present speed reduction device, the axis of the first shaft portion and the axis of the second shaft portion coincide with the axis of the input shaft, and the axis of the eccentric shaft portion shifts from the axis of the input shaft. In this case, the axis of the first shaft portion can be considered to correspond to the center axis of its circumferential surface at which the first shaft portion is supported by the housing, the axis of the second shaft portion can be considered to correspond to the center axis of its circumferential surface that supports the output shaft, and the axis of the eccentric shaft portion can be considered to correspond to the center axis of its circumferential surface that supports the planetary gear member. In a case where the output shaft is supported by the outer circumferential surface of the second shaft portion, the axis of the second shaft portion is the center axis of the outer circumferential surface. On the other hand, in a case where the second shaft portion has a hollow shape and the output shaft is supported by the inner circumferential surface of the second shaft portion, the axis of the second shaft portion is the center axis of the inner circumferential surface. In this case, the axis of the second shaft portion is not defined by the outer circumferential surface thereof.

The layout of the first internally toothed gear, the first externally toothed gear, the second internally toothed gear, and the second externally toothed gear in the present speed reduction device is not limited to any particular one. For instance, the following four configurations are employable: (A) a configuration in which the first internally toothed gear is provided on the housing, the first externally toothed gear is provided on the planetary gear member, the second internally toothed gear is provided on the planetary gear member, and the second externally toothed gear is provided on the output shaft; (B) a configuration in which the first internally toothed gear is provided on the housing, the first externally toothed gear is provided on the planetary gear member, the second internally toothed gear is provided on the output shaft, and the second externally toothed gear is provided on the planetary gear member; (C) a configuration in which the first internally toothed gear is provided on the planetary gear member, the first externally toothed gear is provided on the housing, the second internally toothed gear is provided on the planetary gear member, and the second externally toothed gear is provided on the output shaft; and (D) a configuration in which the first internally toothed gear is provided on the planetary gear member, the first externally toothed gear is provided on the housing, the second internally toothed gear is provided on the output shaft, and the second externally toothed gear is provided on the planetary gear member.

More specifically, the speed reduction device according to the present disclosure may be configured as follows. That is, the first internally toothed gear is fixedly supported by the housing, the first externally toothed gear and the second internally toothed gear are formed at a radially outer portion of the planetary gear member, and the second externally toothed gear is formed on a flange of the output shaft. In the thus constructed speed reduction device, the input-side meshing position and the output-side meshing position are different from each other in phase by 180° in the circumferential direction, resulting in good balance in the loads that act on the planetary gear member.

The speed reduction device according to the present disclosure may be configured such that each of the first internally toothed gear and the second internally toothed gear has a circular arc tooth profile and each of the first externally toothed gear and the second externally toothed gear has an epitrochoid parallel curve tooth profile. According to this configuration, the present speed reduction device functions as what is called cycloid speed reducer, so that smooth rotational deceleration is achieved.

The speed reduction device according to the present disclosure may be configured such that the first shaft portion of the input shaft is supported by the housing also through a fourth bearing at a fourth support position located opposite to the second support position with respect to the first support position in the axial direction. This configuration enables the input shaft to be securely supported by the housing in a state in which the support load in the radial direction does not substantially act on the fourth bearing.

The brake actuator according to the present disclosure may be configured such that the input shaft is a cylindrical member that functions as a rotor of the electric motor and the output shaft and the motion converting mechanism are disposed in the input shaft. This configuration achieves the brake actuator that is more compact in size.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be explained below in detail a speed reduction device according to one embodiment of the present disclosure and a brake actuator according to one embodiment of the present disclosure including the speed reduction device. It is to be understood that the present disclosure is not limited to the details of the following embodiment but may be embodied with other changes and modifications based on the knowledge of those skilled in the art.

A. Electric Brake Device Including Brake Actuator

Figure 1:
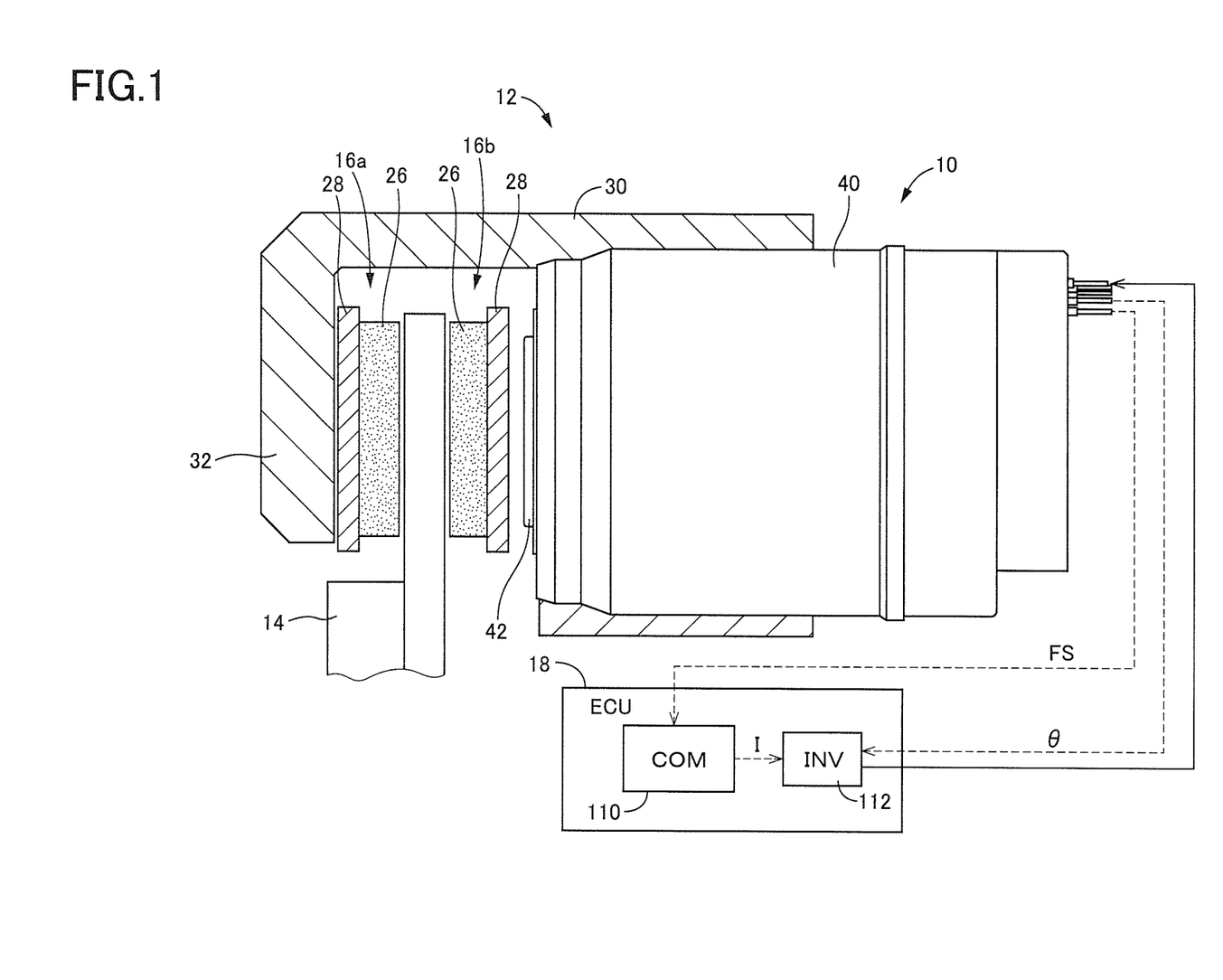
FIG. 1 is a view of an electric brake device that includes a brake actuator according to one embodiment of the present disclosure.

As shown in FIG. 1, a brake actuator 10 (hereinafter simply referred to as "actuator 10" where appropriate) according to the present embodiment is employed in an electric brake device as a major constituent element. The electric brake device includes: a brake caliper 12 (hereinafter simply referred to as "caliper 12" where appropriate) that holds the actuator 10; a disc rotor 14, as a rotary body, configured to rotate with a wheel; a pair of brake pads 16a, 16b (hereinafter simply referred to as "pads 16a, 16b", "pad 16a" or "pad 16b" where appropriate); and an electronic control unit (ECU) 18, as a controller, which will be explained in detail.

The caliper 12 is held by a mount (not shown) provided on a carrier (not shown) that rotatably holds the wheel, such that the caliper 12 is movable in the axial direction, i.e., in the right-left direction in FIG. 1, and such that the caliper 12 straddles the disc rotor 14. The pads 16a, 16b are held by the mount so as to sandwich the disc rotor 14 therebetween in a state in which the pads 16a, 16b are movable in the axial direction. Each of the pads 16a, 16b includes: a friction member 26 disposed on one side thereof on which the pad 16a, 16b comes into contact with the disc rotor 14; and a backup plate 28 supporting the friction member 26. The friction member 26 of each pad 16a, 16b is configured to be pushed onto the disc rotor 14.

For the sake of convenience, the left side and the right side in FIG. 1 are defined as a front side and a rear side, respectively. The pad 16a located on the front side is supported by a front end portion (claw portion) 32 of a caliper main body 30. The actuator 10 is held by a rear-side portion of the caliper main body 30 such that a housing 40 of the actuator 10 is fixed to the rear-side portion of the caliper main body 30. The actuator 10 includes a piston 42 configured to advance and retract relative to the housing 40. When the piston 42 advances, a front end portion, specifically, a front end, of the piston 42 comes into engagement with the pad 16b located on the rear side, specifically, the backup plate 28 of the rear-side pad 16b. When the piston 42 further advances while being kept engaged with the backup plate 28 of the rear-side pad 16b, the pads 16a, 16b sandwich or nip the disc rotor 14 therebetween. In other words, the friction members 26 of the pads 16a, 16b are pushed onto the disc rotor 14. Owing to the pushing by the pads 16a, 16b, there is generated a braking force for stopping rotation of the wheel that depends on a friction force between the disc rotor 14 and the friction members 26, in other words, there is generated a braking force for reducing the speed of the vehicle or stopping the vehicle.

B. Basic Structure of Brake Actuator

Figure 2:
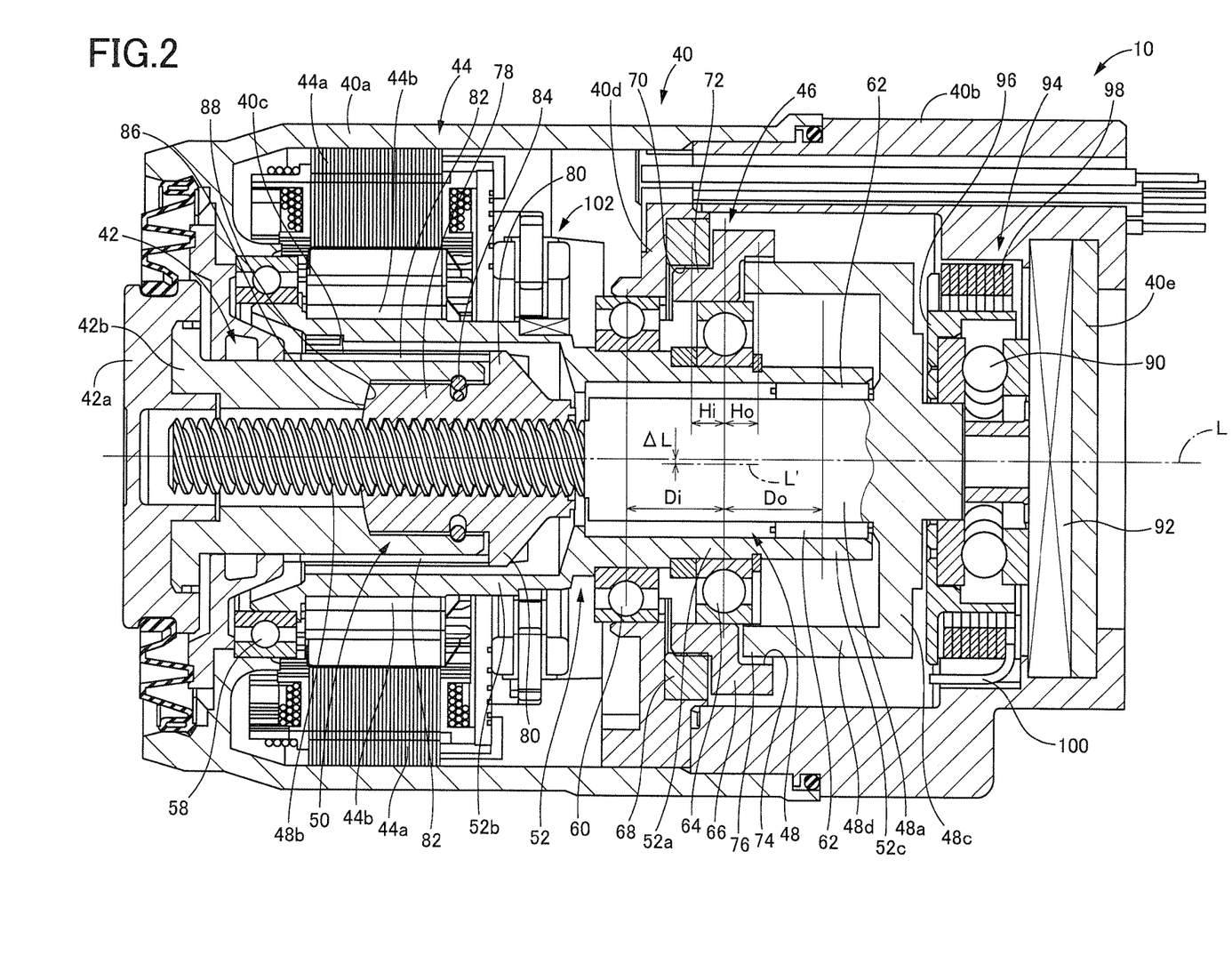
FIG. 2 is a cross-sectional view of the brake actuator of the embodiment.

As shown in FIG. 2, the actuator 10 includes the housing 40, the piston 42, an electric motor (three-phase DC brushless motor) 44 as a drive source, a speed reduction mechanism 46 for decelerating rotation of the electric motor 44, a rotational shaft 48 configured to be rotated by the rotation of the electric motor 44 decelerated by the speed reduction mechanism 46, and a motion converting mechanism 50 configured to convert the rotational motion of the rotational shaft 48 into an advancing and retracting movement (forward and backward movement) of the piston 42. In the following description, the left side and the right side in FIG. 2 are defined as a front side and a rear side, respectively, for the sake of convenience. It is noted that the speed reduction mechanism 46 is one example of a speed reduction device according to the present disclosure, and its structure will be later explained in detail.

The housing 40 is constituted by: a front-side casing 40a and a rear-side casing 40b each having a generally cylindrical shape; an inner sleeve 40c which is supported at a front end portion thereof by the front-side casing 40a and in which the piston 42 is disposed; a generally annular support wall 40d disposed radially inward of the front-side casing 40a and supported by a front end of the rear-side casing 40b; and a support plate 40e fixedly held by a rear end portion of the rear-side casing 40b.

The piston 42 includes a piston head 42a and a hollow piston cylinder 42b. The actuator 10 includes a cylindrically shaped hollow shaft 52. A front-side portion of the hollow shaft 52 functions as a motor shaft (rotor) that is a rotary drive shaft of the electric motor 44, and a rear-side portion of the hollow shaft 52 functions as an input shaft of the speed reduction mechanism 46 that will be later explained in detail. In other words, the cylindrically shaped hollow shaft 52 is considered as being formed by integrating the motor shaft of the electric motor 44 and the input shaft of the speed reduction mechanism 46 that is configured to be rotated by the electric motor 44. In short, the hollow shaft 52 itself is regarded as the input shaft of the speed reduction mechanism 46, and the hollow shaft 52 itself is regarded as the motor shaft of the electric motor 44. The electric motor 44 is constituted by coils 44a held by the front-side casing 40a of the housing 40 so as to be fixed to an inner circumference of the front-side casing 40a and magnets 44b provided on an outer circumference of the front-side portion of the hollow shaft 52 so as to be opposed to the coils 44a.

The hollow shaft 52 is disposed such that the front-side portion thereof incorporates the inner sleeve 40c. Further, the hollow shaft 52 is supported by the housing 40 through two radial ball bearings 58, 60 so as to be rotatable about an axis L that is a center axis of the actuator 10 and so as to be immovable in an axial direction that is a direction of extension of the axis L. Specifically, the hollow shaft 52 is supported at a front end portion thereof by the front-side casing 40a through the radial ball bearing 58 and is supported at a rear-side portion thereof by the support wall 40d through the radial ball bearing 60. More specifically, the hollow shaft 52 functioning as the motor shaft is rotatably supported at its outer circumferential surface by the housing 40.

The rotational shaft 48 is constituted by integrally formed four portions, i.e., an output shaft portion 48a functioning as an output shaft of the speed reduction mechanism 46, an external thread portion 48b which is located on the front side of the output shaft portion 48a and is externally threaded, a flange portion 48c disposed at a rear end of the output shaft portion 48a, and an outer cylindrical portion 48d generally cylindrically shaped and extending from an outer peripheral end of the flange portion 48c in the axial direction. The outer cylindrical portion 48d may be regarded as a part of the flange portion 48c. The rotational shaft 48 is supported at the output shaft portion 48a thereof by an inner circumferential portion of the hollow shaft 52 through rollers (that are also referred to as needles) 62, such that the rotational shaft 48 is rotatable about the axis L. That is, the rotational shaft 48 is rotatably supported at its outer circumferential surface by an inner circumferential surface of the hollow shaft 52 as the motor shaft through rollers 62. It is noted that the rollers 62 constitute a radial bearing.

In addition to the hollow shaft 52 that functions as the input shaft and the rotational shaft 48 whose output shaft portion 48a functions as the output shaft, the speed reduction mechanism 46 includes a planetary gear member 66 supported by an intermediate portion of the hollow shaft 52 through a radial ball bearing 64 so as to be rotatable and immovable in the axial direction. The intermediate portion of the hollow shaft 52 that supports, on its outer circumference, the planetary gear member 66 through the radial ball bearing 64 has an axis L' defined by its outer circumferential surface, the axis L' being eccentric with respect to the axis L by an eccentric amount ΔL. This intermediate portion will be hereinafter referred to as an eccentric shaft portion 52a, and the axis L' will be hereinafter referred to as an eccentric axis L'. In this configuration, the planetary gear member 66 is configured to not only rotate about the eccentric axis L', but also revolve about the axis L in conjunction with rotation of the hollow shaft 52 about the axis L.

The hollow shaft 52 is divided, in the axial direction, into three portions including the eccentric shaft portion 52a. Specifically, the hollow shaft 52 includes the eccentric shaft portion 52a, a first shaft portion 52b located on the front side of the eccentric shaft portion 52a and supported by the housing 40 through the two radial ball bearings 58, 60, and a second shaft portion 52c located on the rear side of the eccentric shaft portion 52a and supporting, at its inner circumferential surface, the rotational shaft 48 through the rollers 62. The inner circumferential surface of the eccentric shaft portion 52a and the inner circumferential surface of the second shaft portion 52c are continuous to each other without any step, and the outer circumferential surface of the eccentric shaft portion 52a and the outer circumferential surface of the second shaft portion 52c are continuous to each other without any step. In terms of supporting of the planetary gear member 66 and the rotational shaft 48, however, it can be considered that the eccentric shaft portion 52a is a portion eccentric with respect to the axis L, and the second shaft portion 52c is a portion not eccentric with respective to the axis L, namely, a portion coaxial with the axis L, as well as the first shaft portion 52b.

Figure 3A:
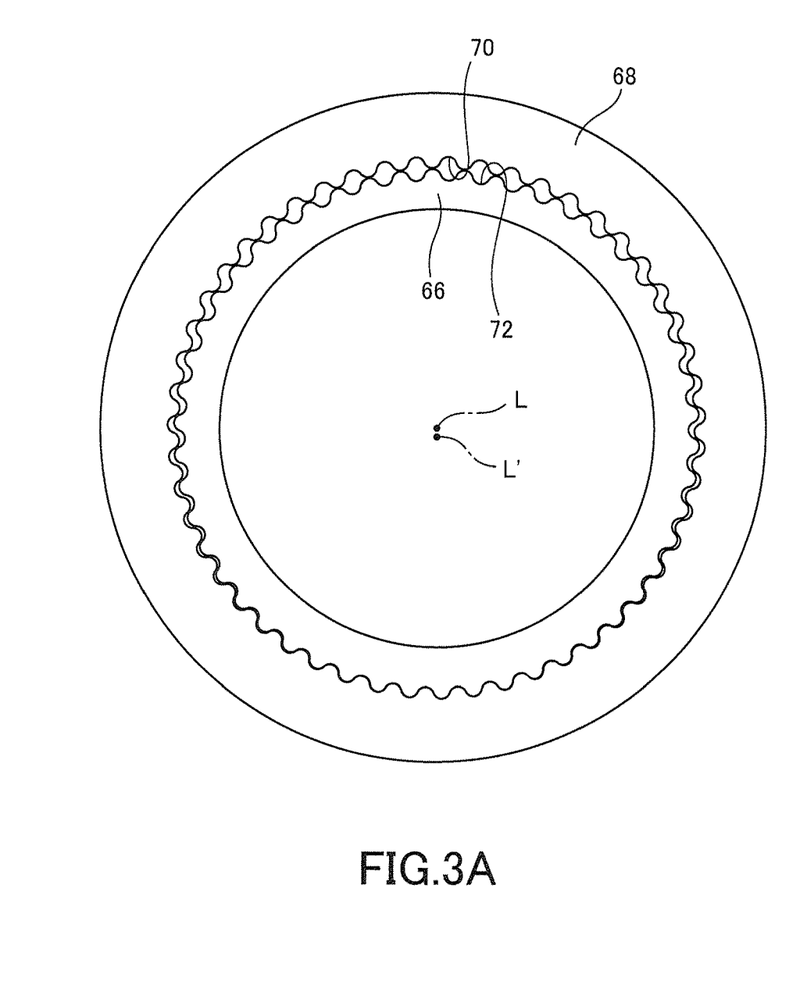
FIG. 3A is a view for explaining a speed reduction mechanism that constitutes the brake actuator of the embodiment and FIG. 3B is another view for explaining the speed reduction mechanism that constitutes the brake actuator of the embodiment, the speed reduction mechanism being an example of a speed reduction device according to the present disclosure.
Figure 3B:
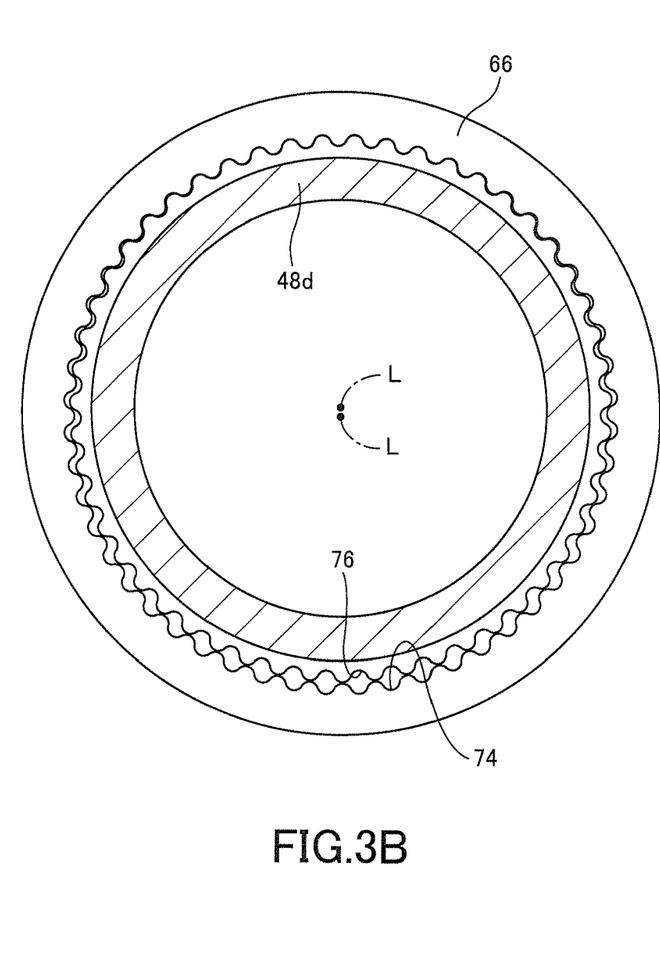

The speed reduction mechanism 46 includes a ring gear member 68 that is fixedly supported by the support wall 40d of the housing 40. As also shown in FIG. 3A, a first internally toothed gear 70 is formed on the ring gear member 68. Further, a first externally toothed gear 72, a part of which is in mesh with a part of the first internally toothed gear 70, is formed at a radially outer portion of the planetary gear member 66. As also shown in FIG. 3B, a second internally toothed gear 74 is formed at the radially outer portion of the planetary gear member 66 so as to be arranged side by side with the first externally toothed gear 72 in the axial direction. Further, a second externally toothed gear 76, a part of which is in mesh with a part of the second internally toothed gear 74, is formed at a radially outer portion at a front end of the outer cylindrical portion 48d of the rotational shaft 48. In this respect, if the outer cylindrical portion 48d is regarded as a part of the flange portion 48c, it can be considered that the second externally toothed gear 76 is formed at a radially outer portion of a flange of the rotational shaft 48.

The center of the first internally toothed gear 70 lies on the axis L while the center of the first externally toothed gear 72 lies on the eccentric axis L'. The center of the second internally toothed gear 74 lies on the eccentric axis L' while the center of the second externally toothed gear 76 lies on the axis L. The meshing position of the first internally toothed gear 70 and the first externally toothed gear 72 is located opposite to the meshing position of the second internally toothed gear 74 and the second externally toothed gear 76 with respect to the axis L or the eccentric axis L'. That is, those meshing positions are different from each other in phase by 180° in the circumferential direction. In other words, the speed reduction mechanism 46 is a differential speed reduction device including: a first internally meshing planetary gear mechanism constituted by the first internally toothed gear 70 and the first externally toothed gear 72 that is meshing internally with the first internally toothed gear 70; and a second internally meshing planetary gear mechanism constituted by the second internally toothed gear 74 and the second externally toothed gear 76 that is meshing internally with the second internally toothed gear 74.

The first internally toothed gear 70 has a circular arc tooth profile, and the first externally toothed gear 72 has an epitrochoid parallel curve tooth profile. Similarly, the second internally toothed gear 74 has a circular arc tooth profile, and the second externally toothed gear 76 has an epitrochoid parallel curve tooth profile. Thus, the speed reduction mechanism 46 is constructed as a cycloid speed reducer. The thus constructed speed reduction mechanism 46 achieves a mechanism in which the number of teeth of the first internally toothed gear 70 and the number of teeth of the first externally toothed gear 72 differ from each other only by one and the number of teeth of the second internally toothed gear 74 and the number of teeth of the second externally toothed gear 76 differ from each other only by one. Accordingly, the speed reduction mechanism 46 is constructed as a speed reduction mechanism which has a high reduction ratio (i.e., a considerably small ratio of the rotation speed of the rotational shaft 48 as the output shaft with respect to the rotation speed of the hollow shaft 52 as the input shaft) and which is capable of performing smooth deceleration.

As shown in FIG. 2, the motion converting mechanism 50 is constituted by the rotational shaft 48, specifically, the external thread portion 48b of the rotational shaft 48, and a nut 78 that is threadedly engaged with the external thread portion 48b and functions as a movable member. Each of an external thread of the external thread portion 48b and an internal thread of the nut 78 is a trapezoidal thread and is a multiple thread, specifically, a triple thread in the present actuator 10. Two protrusions 80 each functioning as a key are formed on an outer circumference of the nut 78. The two protrusions 80 are respectively held in engagement with two slots 82 formed on the inner sleeve 40c of the housing 40 so as to extend in the axial direction. Owing to the engagement of the protrusions 80 and the slots 82, the nut 78 is movable in the axial direction while being prohibited from rotating about the axis L. In this respect, an internal thread may be formed on the rotational shaft 48, and there may be provided a movable member which has an external thread threadedly engaged with the internal thread and which is configured to advance and retract by the rotation of the rotational shaft 48.

A front-side portion of the nut 78 as the movable member is disposed in a rear-side portion of the piston cylinder 42b of the piston 42, and the piston 42 is prohibited from being withdrawn from the nut 78 by a stopper ring 84. A distal end face 86 of the nut 78 is held in contact with a contact surface 88 formed in the piston cylinder 42b. A forward force of the nut 78 is transmitted as a forward force of the piston 42 via the mutually contacting distal end face 86 and contact surface 88. The forward force of the piston 42 functions as a force by which the piston 42 pushes the friction members 26 of the brake pads 16a, 16b onto the disc rotor 14, i.e., a pushing force. A force that causes the piston 42 to be inclined in the radial direction may act on the piston 42 when the piston 42 is pushing the friction members 26, due to uneven wear of the friction members 26 of the brake pads 16a, 16b, inclination of the disc rotor 14 in turning of the vehicle, or the like. In such a case, the distal end face 86 and the contact surface 88 are allowed to be shifted or moved relative to each other in the radial direction, so that the piston 42 is allowed to be inclined to some extent.

The rotational shaft 48 is supported, at the flange portion 48c formed at its rear end, by the housing 40 through a thrust bearing, namely, a thrust ball bearing 90. Specifically, a pushing-force sensor 92 is disposed between the thrust ball bearing 90 and the support plate 40e for detecting the pushing force (axial force). The rotational shaft 48 is supported by the support plate 40e of the housing 40 also through the pushing-force sensor 92. In this respect, the structure of the pushing-force sensor 92 and the supporting structure through the pushing-force sensor 92 are not illustrated in FIG. 2. An inner race 96, which is a constituent component of a biasing mechanism 94, is disposed between the thrust ball bearing 90 and the flange portion 48c of the rotational shaft 48, and a slight clearance is formed between the inner race 96 and the flange portion 48c. (The clearance is exaggeratedly illustrated in FIG. 2.) When the piston 42 advances and pushes the friction member 26 onto the disc rotor 14, the rotational shaft 48 is retracted by a reaction force of the pushing force and the clearance is removed by contact of the flange portion 48c and the inner race 96, so that the rotational shaft 48 is supported, at its rear end, namely, at the flange portion 48c formed at the rear end, by the housing 40 through the thrust ball bearing 90.

The biasing mechanism 94 is constituted by the inner race 96 explained above and a torsion coil spring 98 disposed in the rear-side casing 40b of the housing 40. One end 100 of the torsion coil spring 98 is retained by the rear-side casing 40b while the other end thereof (not shown) is retained by the inner race 96. When the piston 42 advances and pushes the friction member 26 onto the disc rotor 14, in other words, when the braking force is generated, the clearance is removed, so that the inner race 96 starts rotating together with the rotational shaft 48. With an increase in the braking force, namely, with further rotation of the rotational shaft 48, the inner race 96 is further rotated to cause the torsion coil spring 98 to be twisted. An elastic reaction force of the torsion coil spring 98 acts on the rotational shaft 48 as a rotational biasing force in a direction in which the piston 42 is retracted. Even in a case where the electric motor 44 fails to generate the rotational driving force when the braking force is being generated, the piston 42 is retracted to a set rearward position, namely, to substantially the position of the piston 42 shown in FIG. 2, by the rotational biasing force, thus preventing a phenomenon in which the disc rotor 14 keeps rotating with the friction members 26 pushed onto the disc rotor 14, i.e., what is called drag phenomenon.

While not illustrated in detail, the pushing-force sensor 92 is constituted mainly by a load cell. The actuator 10 includes a rotation angle sensor 102 for detecting a rotation angle (rotational phase) of the hollow shaft 52 as the motor shaft, in addition to the pushing-force sensor 92. The rotation angle sensor 102 is a resolver.

As shown in FIG. 1, the ECU 18 as the controller includes a computer 110 constituted by a CPU, a RAM, a ROM, etc., and an inverter 112 that is a drive circuit (driver) of the electric motor 44. The pushing force FS detected by the pushing-force sensor 92 and the rotation angle θ of the hollow shaft 52 detected by the rotation angle sensor 102 are transmitted to the computer 110 and the inverter 112. The control of the actuator will be briefly explained. The computer 110 determines a required braking force that is a braking force to be generated by the electric brake device based on a degree of the operation of the brake operation member such as a brake pedal, and determines, based on the required braking force, a target pushing force that is a target of the pushing force FS. The computer then determines a target supply current that is an electric current I to be supplied to the electric motor 44, such that the pushing force FS detected by the pushing-force sensor 92 becomes equal to the target pushing force. The inverter 112 controls the electric motor 44 based on the detected rotation angle θ according to the target supply current.

In the actuator 10, the rotational shaft 48, the piston 42, and the electric motor 44 are disposed roughly coaxially so as to be arranged in this order from the center toward the radially outer side. Thus, the actuator 10 has a reduced axial dimension. Accordingly, the actuator 10 is compact in size, and the electric brake device that employs the actuator 10 is also compact in size.

C. Characteristic Structure of Brake Actuator

The actuator 10 according to the present embodiment is characterized by the structure of the speed reduction mechanism 46 as the speed reduction device of the present disclosure. For easier understanding of the characteristic structure, a modification of the speed reduction mechanism 46, namely, a typical example of the speed reduction device, will be explained.

Figures 4A, 4B, 4C:
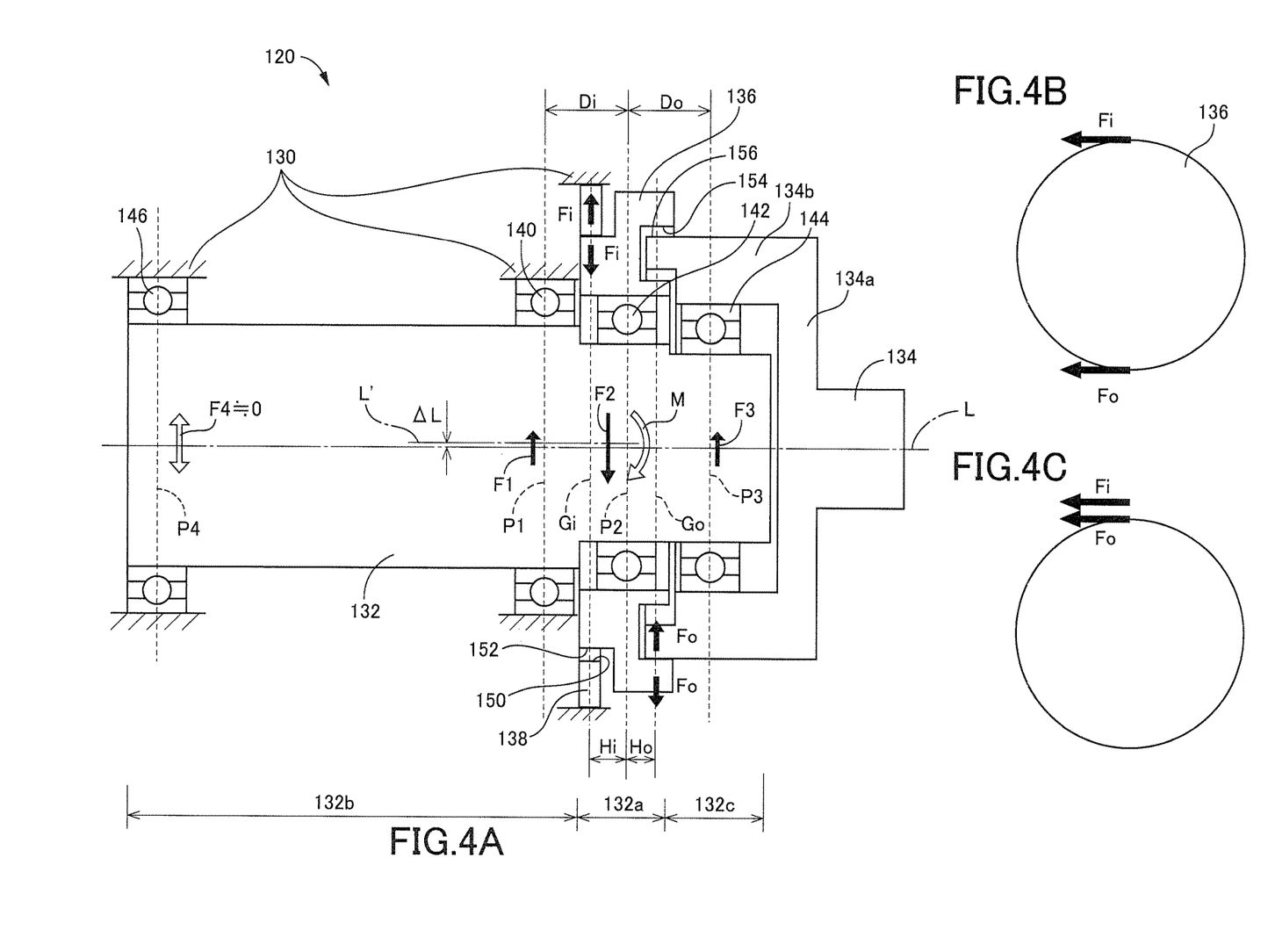
FIGS. 4A-4C are views schematically illustrating a speed reduction device according to a modification.

A speed reduction device 120 according to the modification schematically illustrated in FIG. 4A includes a housing 130, an input shaft 132, an output shaft 134, a planetary gear member 136, and a ring gear member 138. The input shaft 132 is divided, in the axial direction in which the axis L extends, into an eccentric shaft portion 132a, a first shaft portion 132b, and a second shaft portion 132c. The first and second shaft portions 132b, 132c are respectively located on opposite sides of the eccentric shaft portion 132a in the axial direction. The center axis of the eccentric shaft portion 132a defined by its outer circumferential surface is eccentric with respect to the axis L by an eccentric amount ΔL. The center axis of the eccentric shaft portion 132a will be hereinafter referred to as an eccentric axis L'. In this configuration, the planetary gear member 136 is configured to not only rotate about the eccentric axis L', but also revolve about the axis L in conjunction with the rotation of the input shaft 132 about the axis L. The output shaft 134 includes a flange portion 134a and an outer cylindrical portion 134b.

The input shaft 132 is rotatably supported, at the first shaft portion 132b thereof, by the housing 130 through a first bearing 140 that is a radial bearing. The planetary gear member 136 is rotatably supported by the eccentric shaft portion 132a of the input shaft 132 through a second bearing 142 that is a radial bearing. The output shaft 134 is rotatably supported, at the inner circumferential surface of the outer cylindrical portion 134b thereof, by the second shaft portion 132c of the input shaft 132 through a third bearing 144 that is a radial bearing. It is noted that the input shaft 132 is supported also at a position different from the position at which the input shaft 132 is supported by the first bearing 140. Specifically, the input shaft 132 is rotatably supported at a position distant from the position supported by the first bearing 140 in a direction away from the eccentric shaft portion 132a, by the housing 130 through a fourth bearing 146 that is a radial bearing.

As in the speed reduction mechanism 46, in the speed reduction device 120, a first internally toothed gear 150 is formed on the ring gear member 138 that is fixedly supported by the housing 130, and a first externally toothed gear 152, a part of which is in mesh with a part of the first internally toothed gear 150, is formed at a radially outer portion of the planetary gear member 136. Further, a second internally toothed gear 154 is formed at the radially outer portion of the planetary gear member 136 so as to be arranged side by side with the first externally toothed gear 152 in the axial direction, and a second externally toothed gear 156, a part of which is in mesh with a part of the second internally toothed gear 154, is formed at a radially outer portion of the front end of the outer cylindrical portion 134b of the output shaft 134.

As in the speed reduction mechanism 46, in the speed reduction device 120, the center of the first internally toothed gear 150 lies on the axis L while the center of the first externally toothed gear 152 lies on the eccentric axis L'. The center of the second internally toothed gear 154 lies on the eccentric axis L' while the center of the second externally toothed gear 156 lies on the axis L. The meshing position of the first internally toothed gear 150 and the first externally toothed gear 152 is located opposite to the meshing position of the second internally toothed gear 154 and the second externally toothed gear 156 with respect to the axis L or the eccentric axis L', in other words, those meshing positions are different from each other in phase by 180° in the circumferential direction. Like the speed reduction mechanism 46, the speed reduction device 120 is constructed as a differential speed reduction device including: a first internally meshing planetary gear mechanism constituted by the first internally toothed gear 150 and the first externally toothed gear 152 that is meshing internally with the first internally toothed gear 150; and a second internally meshing planetary gear mechanism constituted by the second internally toothed gear 154 and the second externally toothed gear 156 that is meshing internally with the second internally toothed gear 154. Further, as in the speed reduction mechanism 46, the first internally toothed gear 150 has a circular arc tooth profile, the first externally toothed gear 152 has an epitrochoid parallel curve tooth profile, the second internally toothed gear 154 has a circular arc tooth profile, and the second externally toothed gear 156 has an epitrochoid parallel curve tooth profile. Thus, the speed reduction device 120 operates in the same manner as the speed reduction mechanism 46 in terms of deceleration of the rotation.

Here, the position in the axial direction at which the input shaft 132 is supported through the first bearing 140 is defined as a first support position P1, the position in the axial direction at which the planetary gear member 136 is supported through the second bearing 142 is defined as a second support position P2, the position in the axial direction at which the output shaft 134 is supported through the third bearing 144 is defined as a third support position P3, and the position in the axial direction at which the input shaft 132 is supported through the fourth bearing 146 is defined as a fourth support position P4. In the speed reduction device 120, a distance between the first support position P1 and the second support position P2, i.e., an input-side supporting distance Di, is equal to a distance between the second support position P2 and the third support position P3, i.e., an output-side supporting distance Do. Further, the position in the axial direction at which the first internally toothed gear 150 and the first externally toothed gear 152 are in mesh with each other is defined as an input-side meshing position Gi, and the position in the axial direction at which the second internally toothed gear 154 and the second externally toothed gear 156 are in mesh with each other is defined as an output-side meshing position Go. In the speed reduction device 120, a distance between the second support position P2 and the input-side meshing position Gi, i.e., an input-side meshing distance Hi, is equal to a distance between the second support position P2 and the output-side meshing position Go, i.e., an output-side meshing distance Ho. It is noted that supporting by each bearing and meshing of the gears are each established in a certain area (that is a concept including a distance, a width or the like) in the axial direction. Accordingly, the center of the area is regarded as each support position or each meshing position for convenience sake in the present disclosure. However, each support position and each meshing position may be set suitably within the area in the actual speed reduction device 120.

When the speed reduction device 120 operates, the planetary gear member 136 receives, at the meshing position of the first internally toothed gear 150 and the first externally toothed gear 152, a force (that may be referred to as a contact force) Fi from the ring gear member 138 supported by the housing 130 while the ring gear member 138 receives, at the meshing position, the same magnitude of the force Fi as reaction from the planetary gear member 136, as shown in FIG. 4. Similarly, the planetary gear member 136 receives, at the meshing position of the second internally toothed gear 154 and the second externally toothed gear 156, a force (that may be referred to as a contact force) Fo from the output shaft 134 while the output shaft 134 receives, at the meshing position, the same magnitude of the force Fo as reaction from the planetary gear member 136. Though each of the force Fi and the force Fo that the planetary gear member 136 receives is represented as a force in the radial direction in FIG. 4A for convenience sake, the force Fi and the force Fo actually act in the circumferential direction as illustrated in FIG. 4B. It can be considered that the force Fi and the force Fo that the planetary gear member 136 receives are substantially identical to each other in direction and magnitude. The force Fi and the force Fo act on the input shaft 132 from the planetary gear member 136. Because the input-side meshing distance Hi and the output-side meshing distance Ho are equal to each other in the speed reduction device 120, moment M shown in FIG. 4A, namely, moment M that causes the input shaft 132 to rotate, hardly acts on the input shaft 132.

Because the moment M need not be taken into consideration, a force F2 that acts on the input shaft 132 at the second support position P2 and a force F3 that acts on the input shaft 132 at the third support position P3 can be represented as follows, as apparent from FIGS. 4A and 4B:

$$F2=-Fi-Fo,\ F3=Fo$$

When a force F1 that acts on the input shaft 132 at the first support position P1 and a force F4 that acts on the input shaft 132 at the fourth support position P4 are taken into consideration, the forces that act on the input shaft 132 are in a balanced state as represented as follows:

$$F1+F2+F3+F4=0$$

Substitution of F2 represented by the above equation and F3 represented by the above equation cancels the force Fo, and the balanced state is accordingly represented as follows:

$$F1-Fi-Fo+Fo+F4=F1-Fi+F4=0$$

According to the above equation, F4 is equal to 0 (F4=0) when F1 is equal to Fi (F1=Fi). Because the input-side supporting distance Di is equal to the output-side supporting distance Do (Di=Do) in the speed reduction device 120, F4 is almost equal to 0 (F4≈0). Thus, the moments that depend respectively on the force F1, the force F2, and the force F3 are balanced. The forces F1, F2, F3, F4 can be regarded as the support loads of the respective bearings 140, 142, 144, 146 to support the input shaft 132. The support loads are almost minimal.

As understood from the description above, the support loads to support the input shaft 132 are well balanced in the speed reduction device 120, enabling efficient deceleration. Further, the present speed reduction device 120 has fewer restrictions on bearings, and general-purpose bearings are available in the present speed reduction device 120, thus obviating a cost increase. In other words, the present speed reduction device 120 is excellent in utility.

The speed reduction device 120 has the configuration (A) in which the first internally toothed gear is provided on the housing, the first externally toothed gear is provided on the planetary gear member, the second internally toothed gear is provided on the planetary gear member, and the second externally toothed gear is provided on the output shaft. The speed reduction device 120 may have the following configurations (B)-(D) each as a modification: (B) a configuration in which the first internally toothed gear is provided on the housing, the first externally toothed gear is provided on the planetary gear member, the second internally toothed gear is provided on the output shaft, and the second externally toothed gear is provided on the planetary gear member; (C) a configuration in which the first internally toothed gear is provided on the planetary gear member, the first externally toothed gear is provided on the housing, the second internally toothed gear is provided on the planetary gear member, and the second externally toothed gear is provided on the output shaft; and (D) a configuration in which the first internally toothed gear is provided on the planetary gear member, the first externally toothed gear is provided on the housing, the second internally toothed gear is provided on the output shaft, and the second externally toothed gear is provided on the planetary gear member. Though the force Fi and the force Fo act on the planetary gear member as illustrated in FIG. 4C in the speed reduction device that employs the configuration (B) or (C), the speed reduction device can enjoy the advantages described above that the support loads can be made almost minimal.

Structural differences between the speed reduction mechanism 46 and the speed reduction device 120 are explained. In the speed reduction mechanism 46, the hollow shaft 52 functions as the input shaft, and the rotational shaft 48 functioning as the output shaft is disposed so as to pass through the hollow shaft 52. The speed reduction mechanism 46 differs from the speed reduction device 120 in that the inner circumferential surface of the hollow shaft 52 supports the rotational shaft 48 at its outer circumferential surface through the rollers 62 as the radial bearing. It is noted that the radial ball bearing 60, the radial ball bearing 64, the rollers 62, and the radial ball bearing 58 correspond to the first bearing, the second bearing, the third bearing, and the fourth bearing, respectively.

In spite of the differences described above, the speed reduction device 120 and the speed reduction mechanism 46 are constructed based on the same concept and have the same characteristics. Specifically, as shown in FIG. 2, the input-side meshing distance Hi is equal to the output-side meshing distance Ho, the rotational shaft 48 as the output shaft is supported by the hollow shaft 52 as the input shaft so as to be rotatable, and the input-side supporting distance Di is equal to the output-side supporting distance Do. Thus, the speed reduction mechanism 46 employed in the actuator 10 of the illustrated embodiment also enjoys the advantages that the support loads can be made almost minimal, and efficient deceleration can be performed. Further, the speed reduction mechanism 46 has fewer restrictions on bearings, and general-purpose bearings are available therein, thus obviating a cost increase. As a result, the actuator 10 of the illustrated embodiment is also excellent in utility.

What is claimed is:

1. A speed reduction device including (i) a first internally meshing planetary gear mechanism constituted by a first internally toothed gear and a first externally toothed gear that is meshing internally with the first internally toothed gear and (ii) a second internally meshing planetary gear mechanism constituted by a second internally toothed gear and a second externally toothed gear that is meshing internally with the second internally toothed gear, comprising:
  a housing;
  an input shaft including an eccentric shaft portion located intermediate in an axial direction and a first shaft portion and a second shaft portion respectively located on opposite sides of the eccentric shaft portion in the axial direction, the input shaft being rotatably supported by the housing at the first shaft portion through a first bearing;
  a planetary gear member which is rotatably supported by the eccentric shaft portion of the input shaft through a second bearing and on which one of the first internally toothed gear and the first externally toothed gear and one of the second internally toothed gear and the second externally toothed gear are provided so as to be arranged in the axial direction; and
  an output shaft which is rotatably supported by the second shaft portion of the input shaft through a third bearing and on which the other of the second internally toothed gear and the second externally toothed gear is provided,
  wherein the other of the first internally toothed gear and the first externally toothed gear is provided on the housing,
  wherein, where a position at which the input shaft is supported through the first bearing, a position at which the planetary gear member is supported through the second bearing, and a position at which the output shaft is supported through the third bearing are respectively defined as a first support position, a second support position, and a third support position, a distance in the axial direction between the first support position and the second support position is equal to a distance in the axial direction between the second support position and the third support position; and
  wherein a distance in the axial direction between the second support position and a position at which the first internally toothed gear and the first externally toothed gear are in mesh with each other is equal to a distance in the axial direction between the second support position and a position at which the second internally toothed gear and the second externally toothed gear are in mesh with each other,
  wherein the first shaft portion of the input shaft is supported by the housing also through a fourth bearing at a fourth support position located opposite to the second shaft position with respect to the first support position in the axial direction.

2. The speed reduction device according to claim 1, wherein each of the first internally toothed gear and the second internally toothed gear has a circular arc tooth profile, and each of the first externally toothed gear and the second externally toothed gear has an epitrochoid parallel curve tooth profile.

3. A speed reduction device including (i) a first internally meshing planetary gear mechanism constituted by a first internally toothed gear and a first externally toothed gear that is meshing internally with the first internally toothed gear and (ii) a second internally meshing planetary gear mechanism constituted by a second internally toothed gear and a second externally toothed gear that is meshing internally with the second internally toothed gear, comprising:
  a housing;
  an input shaft including an eccentric shaft portion located intermediate in an axial direction and a first shaft portion and a second shaft portion respectively located on opposite sides of the eccentric shaft portion in the axial direction, the input shaft being rotatably supported by the housing at the first shaft portion through a first bearing;

a planetary gear member which is rotatably supported by the eccentric shaft portion of the input shaft through a second bearing and on which one of the first internally toothed gear and the first externally toothed gear and one of the second internally toothed gear and the second externally toothed gear are provided so as to be arranged in the axial direction; and an output shaft which is rotatably supported by the second shaft portion of the input shaft through a third bearing and on which the other of the second internally toothed gear and the second externally toothed gear is provided, wherein the other of the first internally toothed gear and the first externally toothed gear is provided on the housing, wherein, where a position at which the input shaft is supported through the first bearing, a position at which the planetary gear member is supported through the second bearing, and a position at which the output shaft is supported through the third bearing are respectively defined as a first support position, a second support position, and a third support position, a distance in the axial direction between the first support position and the second support position is equal to a distance in the axial direction between the second support position and the third support position; and wherein a distance in the axial direction between the second support position and a position at which the first internally toothed gear and the first externally toothed gear are in mesh with each other is equal to a distance in the axial direction between the second support position and a position at which the second internally toothed gear and the second externally toothed gear are in mesh with each other, wherein the first internally toothed gear is fixedly supported by the housing, and the first externally toothed gear is formed at a radially outer portion of the planetary gear member, and wherein the second internally toothed gear is formed at the radially outer portion of the planetary gear member, and the second externally toothed gear is formed on the output shaft.

4. A brake actuator including a speed reduction device, the speed reduction device comprising:
(i) a first internally meshing planetary gear mechanism constituted by a first internally toothed gear and a first externally toothed gear that is meshing internally with the first internally toothed gear and (ii) a second internally meshing planetary gear mechanism constituted by a second internally toothed gear and a second externally toothed gear that is meshing internally with the second internally toothed gear;
a housing;
an input shaft including an eccentric shaft portion located intermediate in an axial direction and a first shaft portion and a second shaft portion respectively located on opposite sides of the eccentric shaft portion in the axial direction, the input shaft being rotatably supported by the housing at the first shaft portion through a first bearing;

a planetary gear member which is rotatably supported by the eccentric shaft portion of the input shaft through a second bearing and on which one of the first internally toothed gear and the first externally toothed gear and one of the second internally toothed gear and the second externally toothed gear are provided so as to be arranged in the axial direction; and an output shaft which is rotatably supported by the second shaft portion of the input shaft through a third bearing and on which the other of the second internally toothed gear and the second externally toothed gear is provided, wherein the other of the first internally toothed gear and the first externally toothed gear is provided on the housing, wherein, where a position at which the input shaft is supported through the first bearing, a position at which the planetary gear member is supported through the second bearing, and a position at which the output shaft is supported through the third bearing are respectively defined as a first support position, a second support position, and a third support position, a distance in the axial direction between the first support position and the second support position is equal to a distance in the axial direction between the second support position and the third support position; and wherein a distance in the axial direction between the second support position and a position at which the first internally toothed gear and the first externally toothed gear are in mesh with each other is equal to a distance in the axial direction between the second support position and a position at which the second internally toothed gear and the second externally toothed gear are in mesh with each other, the brake actuator comprising:

an electric motor configured to rotate the input shaft;

a piston configured to push a friction member onto a rotary body that rotates with a wheel: and a motion converting mechanism, including an external thread portion and a nut threadedly engaged with the external thread portion, configured to convert a rotating motion of the output shaft into an advancing and retracting movement of the piston.

5. The brake actuator according to claim 4, wherein the input shaft is a cylindrical member that functions as a rotor of the electric motor, and wherein the output shaft and the motion converting mechanism are disposed in the input shaft.

* * * * *